(12) United States Patent
Parker et al.

(10) Patent No.: US 7,039,706 B1
(45) Date of Patent: May 2, 2006

(54) SESSION ADMISSION CONTROL FOR COMMUNICATION SYSTEMS THAT USE POINT-TO-POINT PROTOCOL OVER ETHERNET

(75) Inventors: Benjamin J. Parker, Overland Park, KS (US); Chuck X. Diaz, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 776 days.

(21) Appl. No.: 10/103,107

(22) Filed: Mar. 21, 2002

(51) Int. Cl.
*H04L 1/00* (2006.01)
*G06F 15/16* (2006.01)

(52) U.S. Cl. .................. 709/226; 709/217; 709/218; 709/223; 709/232; 370/252; 370/468; 370/237

(58) Field of Classification Search ............... 709/226, 709/232, 217–219, 223; 370/237, 252, 468
See application file for complete search history.

(56) References Cited

U.S. PATENT DOCUMENTS

| | | | |
|---|---|---|---|
| 5,898,673 A * | 4/1999 | Riggan et al. ............. | 370/237 |
| 6,219,728 B1 * | 4/2001 | Yin .......................... | 710/52 |
| 6,377,554 B1 * | 4/2002 | Farnsworth et al. ........ | 370/252 |
| 6,473,793 B1 * | 10/2002 | Dillon et al. ............... | 709/223 |
| 6,490,252 B1 * | 12/2002 | Riggan et al. ............. | 370/237 |
| 6,628,609 B1 * | 9/2003 | Chapman et al. .......... | 370/229 |
| 6,754,230 B1 * | 6/2004 | Purpura et al. ............ | 370/468 |
| 2003/0053443 A1 * | 3/2003 | Owens ...................... | 370/352 |
| 2005/0086364 A1 * | 4/2005 | Muti et al. ................ | 709/235 |

\* cited by examiner

*Primary Examiner*—David Wiley
*Assistant Examiner*—Alina Boutah

(57) ABSTRACT

A server system provides admission control for a communication system where Point-to-Point Protocol Over Ethernet (PPPOE) user systems transfer requests to use the communication system and transfer bandwidth usage information indicating their respective bandwidth usage. The server system receives the bandwidth usage information and receives the requests. The server system processes the bandwidth usage information to determine average system bandwidth usage. The server system processes an available system bandwidth and the average system bandwidth usage to determine a maximum bandwidth authorization. The server system determines if the maximum bandwidth authorization exceeds a threshold in response to one of the requests. If the maximum bandwidth authorization exceeds the threshold, then the server system grants the request, but if the maximum bandwidth authorization does not exceed the threshold, then the server system denies the request.

30 Claims, 5 Drawing Sheets

| SYSTEM DATA | |
|---|---|
| MAXIMUM SYSTEM BANDWIDTH (KB/S) | 39,760 |
| USER SYSTEM CONTROL PARAMETER | 10% |
| AVAILABLE SYSTEM BANDWIDTH (KB/S) | 35,784 |
| CURRENT SYSTEM BANDWIDTH USAGE (KB/S) | 33,644 |
| AVERAGE SYSTEM BANDWIDTH USAGE (KB/S) | 33,405 |
| THRESHOLD | 0 |
| GRANT REQUEST | YES |

| CLASS DATA | | | |
|---|---|---|---|
| CLASS | GOLD | SILVER | BRONZE |
| CURRENT USERS | 11 | 65 | 50 |
| SUBSCRIBED BANDWIDTH (KB/S) | 1,544 | 525 | 250 |
| MAXIMUM ENFORCED BANDWIDTH (KB/S) | 1,698 | 578 | 275 |
| MINIMUM ENFORCED BANDWIDTH (KB/S) | 1,390 | 473 | 225 |
| SAMPLE POPULATION | 600 | 600 | 600 |
| AVERAGE BANDWIDTH USAGE (KB/S) | 823 | 275.2 | 134.91 |
| MAXIMUM BANDWIDTH USAGE (KB/S) | 1698 | 575.55 | 273.47 |
| MINIMUM BANDWIDTH USAGE (KB/S) | 7.44 | 0.31 | 0.04 |
| % OF MAXIMUM ENFORCED RATE | 48.43% | 47.65% | 49.06% |
| STANDARD DEVIATION (KB/S) | 484.42 | 164.82 | 78.37 |

FIG. 4

SESSION ADMISSION CONTROL FOR COMMUNICATION SYSTEMS THAT USE POINT-TO-POINT PROTOCOL OVER ETHERNET

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to session admission control for PPPOE communication systems based on actual usage data.

2. Description of the Prior Art

Point-to-Point Protocol Over Ethernet (PPPOE) is a well known technique for users to access a communication system such as the Internet. PPPOE user systems exert their own bandwidth control with a throttling procedure that restricts bandwidth usage to a given range. This range is often expressed as a number of bytes per second plus or minus a percentage of the bytes per second. This percentage is referred to below as a user system control parameter.

A PPPOE user requests access to the communication system though a Remote Access Dial-Up Server (RADIUS) server. To perform admission control, the RADIUS server may check the user name and password for validity. The RADIUS server may also check the number of current users to ensure that this number remains within a total number of allowed users. This approach assumes that the total number of users would use an estimated amount of available bandwidth, so if the number of current users remains below the total, then bandwidth should be available-based on the estimate. Unfortunately, actual bandwidth usage may be higher than the estimate, and degradation in the quality of service will occur. This problem becomes especially acute in overbooking situations where users share far less available bandwidth than they would need if they all tried to use the communication system simultaneously. This typically moves the number of current users closer to the total number of allowed users and allows actual variations in bandwidth usage to seriously degrade quality of service.

Using a communication service that slows to a crawl because of poor quality of service can be extremely frustrating. With increasingly bandwidth hungry user applications, a technique is needed to better provide quality of service to PPPOE users. Some non-PPPOE communications systems, such as Asynchronous Transfer Mode (ATM) systems, use actual usage data for admission control, but such techniques have not been effectively implemented for PPPOE user systems.

SUMMARY OF THE INVENTION

Examples of the invention help solve the above problems by providing admission control for a communication system where Point-to-Point Protocol Over Ethernet (PPPOE) user systems transfer requests to use the communication system and transfer bandwidth usage information indicating their respective bandwidth usage. Advantageously, these examples of the invention are able to improve and maintain quality of service by implementing admission control based on actual system usage. Those skilled in the art will appreciate that examples of the invention are able to provide admission control at or above the network layer—as opposed to conventional admission control implemented at the data link layer. Admission control at the network layer allows better quality of service control than admission control at the data link layer.

Examples of the invention include server systems, methods of server system operation, and software products that direct server system operation. In some examples of the invention, the server system comprises a communication interface and a processing system. The communication interface is configured to receive the bandwidth usage information and to receive the requests. The processing system is configured to process the bandwidth usage information to determine average system bandwidth usage. The processing system is configured to process an available system bandwidth and the average system bandwidth usage to determine a maximum bandwidth authorization. The processing system is configured to determine if the maximum bandwidth authorization exceeds a threshold in response to one of the requests. If the maximum bandwidth authorization exceeds the threshold, then the processing system is configured to grant the one request. If the maximum bandwidth authorization does not exceed the threshold, then the processing system is configured to deny the one request.

BRIEF DESCRIPTION OF THE DRAWINGS

The same reference number represents the same element on all drawings.

FIG. 4 illustrates a model server data structure in an example of the invention.

DETAILED DESCRIPTION OF THE PREFERRED EMBODIMENT

FIGS. 1–5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
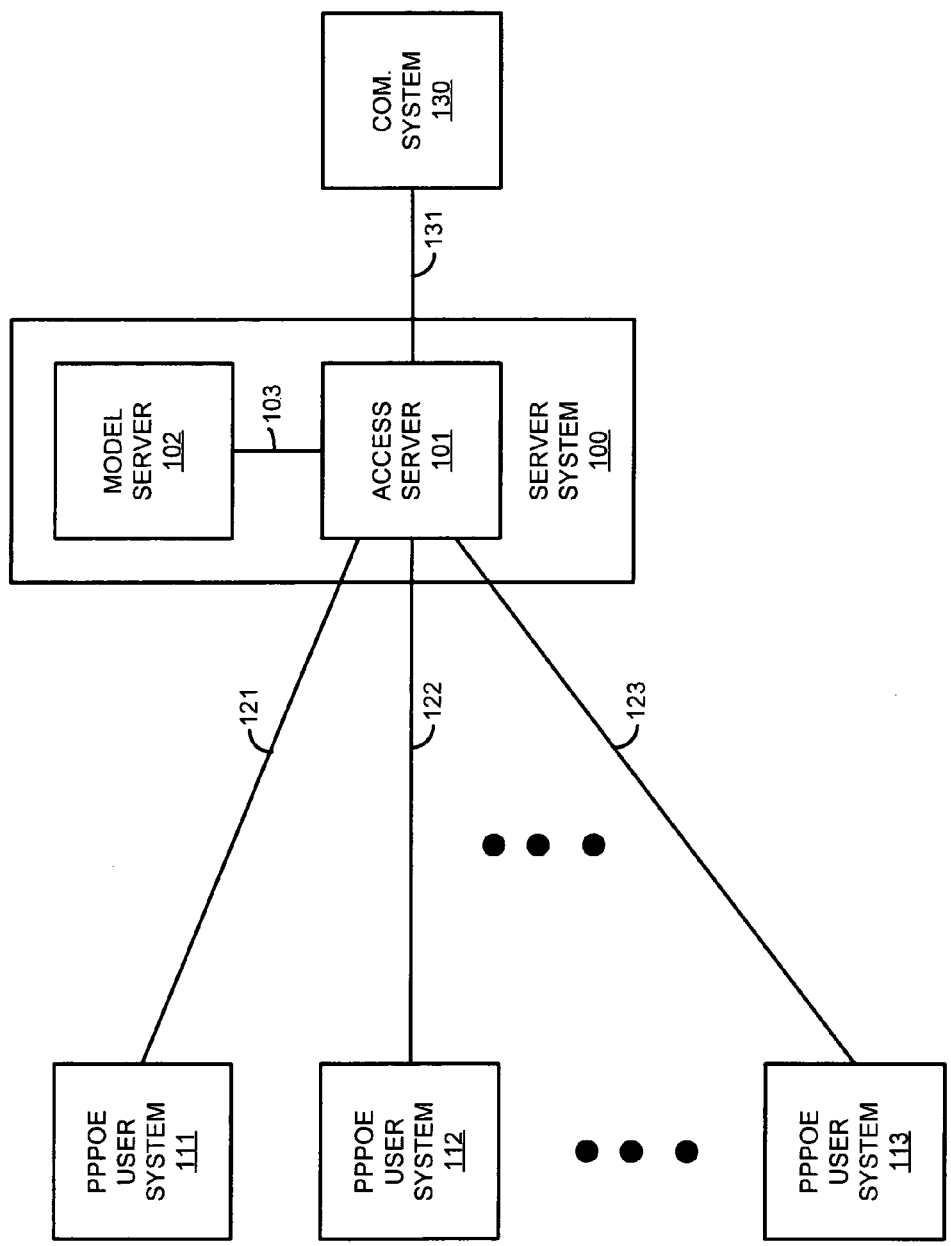
FIG. 1 illustrates a server system in an example of the invention.
Figure 2:
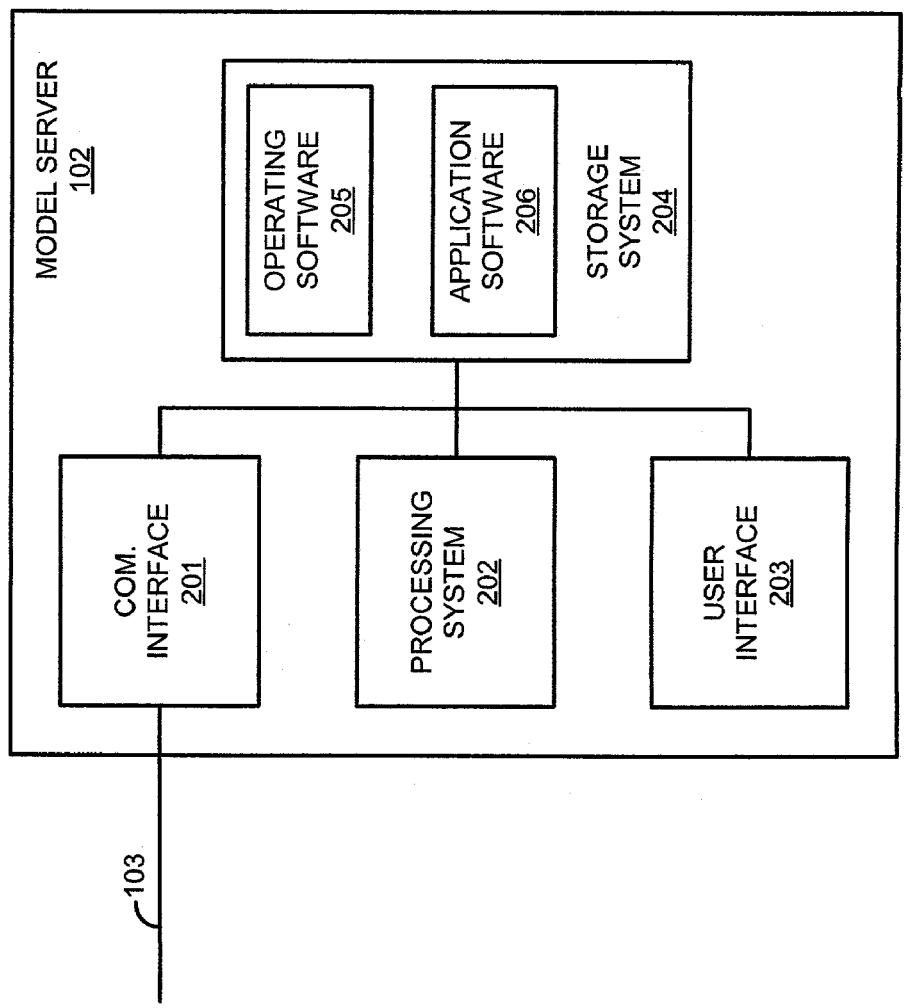
FIG. 2 illustrates a model server in an example of the invention.

Server System Configuration—FIGS. 1–2

FIG. 1 illustrates server system 100 in an example of the invention. Server system 100 includes access server 101 and model server 102 that are coupled over link 103. In alternative examples, access server 101 and model server 102 could be integrated together or distributed among more than two devices.

Access server 101 is coupled to PPPOE user systems 111–113 over respective PPPOE links 121–123. Access server 101 is coupled to communication system 130 over link 131. Links 103, 121–123, and 131 could include multiple communication systems, devices, and links that are not shown for clarity. For example, PPPOE links 121–123 are typically concentrated onto a single network connection prior to reaching access server 101, and this network connection may use other communication protocols. Communication system 130, PPPOE links 121–123, and links 103 and 131 could be conventional. Based on this disclosure, those skilled in the art will appreciate how to modify existing products to make and use PPPOE user systems 111–113 and access server 101.

Server system 100 provides admission control for communication system 130. PPPOE user systems 111–113 transfer requests to use communication system 130 to access server 101. Access server 101 forwards the requests to model server 102. Access server 101 may reformat, regenerate, or otherwise process the requests before forwarding them. Access server 101 may also grant or deny the requests without forwarding in particular situations.

PPPOE user systems 111–113 periodically transfer bandwidth usage information to access server 101 indicating their respective bandwidth usage. For example, PPPOE user systems 111–113 may transfer a message every ten seconds indicating their current bandwidth usage in bits/second. Access server 101 forwards the information to model server 102. Access server 101 may reformat, regenerate, or otherwise process the information before forwarding. Alternatively, PPPOE user systems 111–113 may transfer the bandwidth usage information to model server 102 though other systems and links (not shown).

Model server 102 processes the bandwidth usage information to grant or deny the requests (model server 102 is discussed below in detail). For each request, model server 102 transfers a grant instruction or deny instruction to access server 101. In response to the instructions, access server 101 either provides user access to communication system 130 or informs the affected user system that the request has been denied.

FIG. 2 illustrates model server 102 in an example of the invention. Model server 102 includes communication interface 201, processing system 202, user interface 203, and storage system 204. Storage system 204 stores operating software 205 and application software 206. Processing system 202 is linked to communication interface 201, user interface 203, and storage system 204. Model server 102 could be comprised of a programmed general-purpose computer, although those skilled in the art will appreciate that programmable or special purpose circuitry and equipment may be used. Model server 102 may use a client server architecture where operations are distributed among a server system and client devices that together comprise elements 201–206.

Communication interface 201 could comprise a network interface card, modem, port, or some other communication device. Communication interface 201 may be distributed among multiple communication devices. Processing system 202 could comprise a computer microprocessor, logic circuit, or some other processing device. Processing system 202 may be distributed among multiple processing devices. User interface 203 could comprise a keyboard, mouse, voice recognition interface, microphone and speakers, graphical display, touch screen, or some other type of user device. Storage system 204 could comprise a disk, tape, integrated circuit, server, or some other memory device. Storage system 204 may be distributed among multiple memory devices.

Processing system 202 retrieves and executes operating software 205 and application software 206 from storage system 204. Operating software 205 may comprise an operating system, utilities, drivers, networking software, and other software typically loaded onto a general-purpose computer. Application software 206 could comprise an application program, firmware, or some other form of machine-readable processing instructions. When executed by processing system 202, application software 206 directs processing system 202 to operate as described below.

Figure 3:
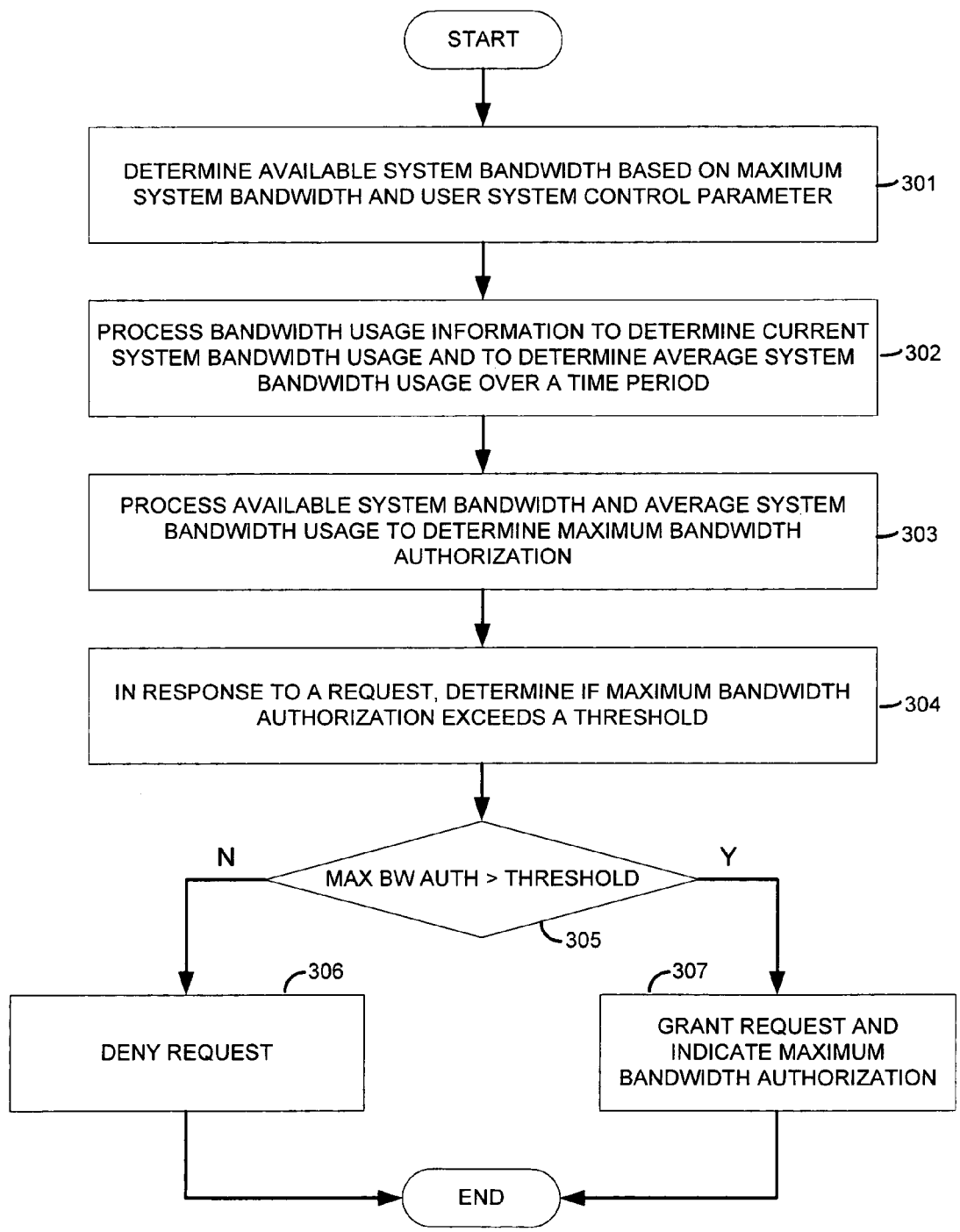
FIG. 3 illustrates model server operation in an example of the invention.

Model Server Operation—FIGS. 3–4

FIG. 3 illustrates the operation of model server 102 in an example of the invention. The reference numbers on FIG. 3 are indicated parenthetically below. Prior to operation, model server 102 is configured with a maximum system bandwidth and a user system control parameter. The maximum system bandwidth may be based on bandwidth constraints for a communication link shared by the PPPOE user systems 111–113. The user system control parameter may be a percentage that represents the granularity of bandwidth enforcement for PPOE user systems 111–113. Through user interface 203, model server 102 may receive and implement modifications to the maximum system bandwidth and the user system control parameter.

In operation, model server 102 determines available system bandwidth based on the maximum system bandwidth and the user system control parameter (301). The following equation may be used:

$$\text{available system bandwidth} = (\text{maximum system bandwidth}) - [(\text{maximum system bandwidth}) \times (\text{user system control parameter})].$$

Alternatively, model server 102 may be configured directly with the available system bandwidth and may receive modifications through user interface 203.

Model server 102 receives and processes the bandwidth usage information to determine current system bandwidth usage (302). Model server 102 also processes the bandwidth usage information to determine average system bandwidth usage over a time period (302). Model server 102 processes the available system bandwidth and the average system bandwidth usage to determine a maximum bandwidth authorization (303).

The following equation may be used:

$$\text{maximum bandwidth authorization} = (\text{available system bandwidth}) - (\text{average system bandwidth}).$$

Model server 102 receives one of the requests, and in response, determines if the maximum bandwidth authorization exceeds a threshold (304). The threshold could be zero and may be modified through user interface 203. The threshold could be the amount of bandwidth requested. If the maximum bandwidth authorization does not exceed the threshold (305), then model server 102 denies the request (306). If the maximum bandwidth authorization exceeds the threshold (305), then model server 102 grants the request and indicates the maximum bandwidth authorization to access server 101 (307). Access server 101 may restrict the granted request to the maximum bandwidth authorization. It should be appreciated that the bandwidth usage information is continually received from the PPPOE user systems 111–113, and thus, the average system bandwidth usage and the maximum bandwidth authorization are continually re-calculated for use in request processing.

FIG. 4 illustrates a model server data structure in an example of the invention. Note that the data structure indicates sample values for the above variables in the system data. Also note that users are separated into classes, and the usage data is tracked per user class. This could be accomplished by correlating the sending address for the bandwidth usage information to users and the users to user classes. The data structure indicates the average system bandwidth usage for classes of the PPPOE user systems.

Figure 5:
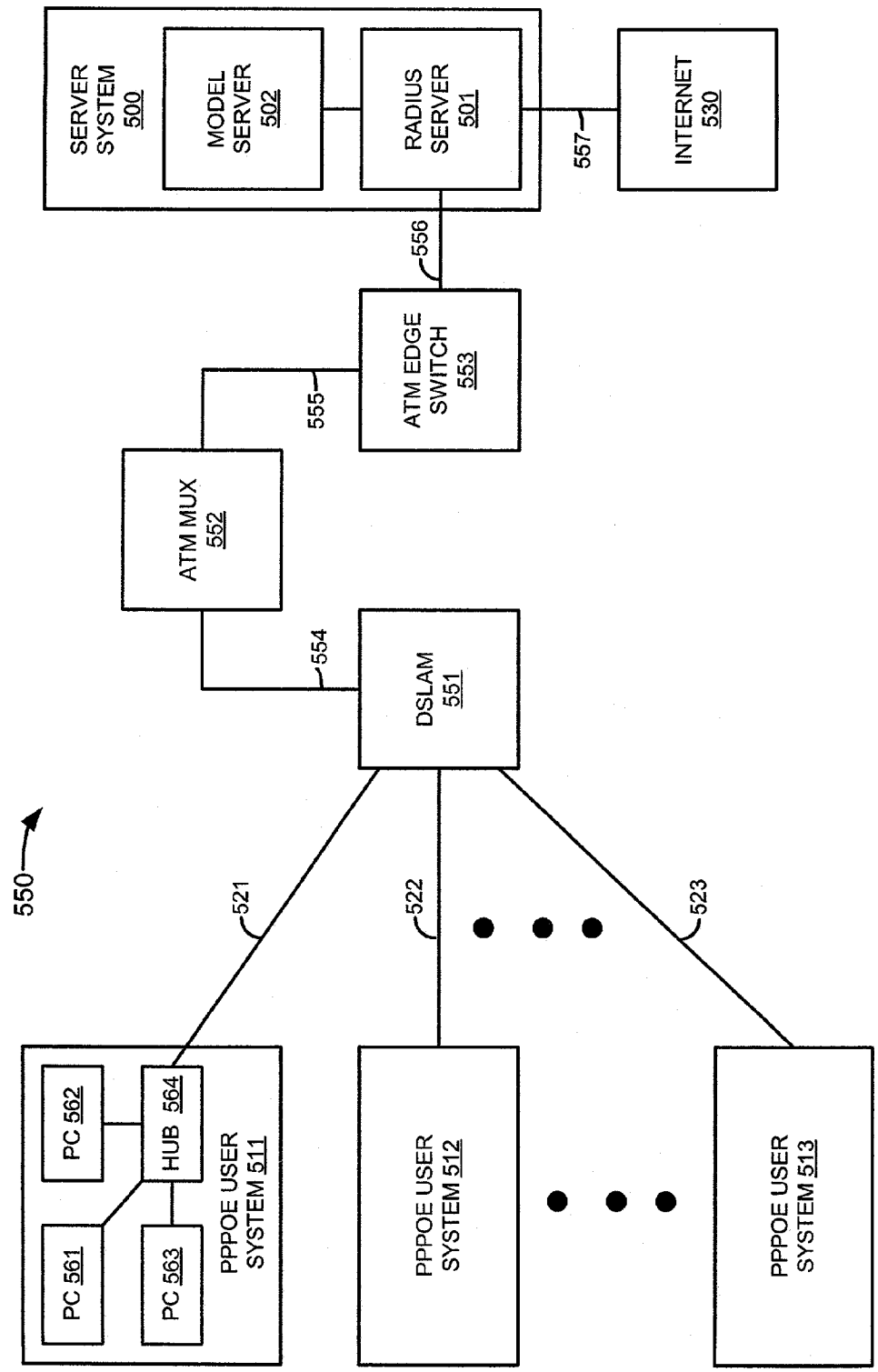
FIG. 5 illustrates a communication network in an example of the invention.

Exemplary Communication System—FIG. 5

FIG. 5 illustrates communication network 550 in an example of the invention. Communication network 550 includes Digital Subscriber Line (DSL) Asynchronous Transfer Mode (ATM) Multiplexer (DSLAM) 551, ATM mux 552, ATM edge switch 553, server system 500, and internet 530. Server system includes RADIUS server 501 and model server 502 that respectively correspond to access server 101 and model server 102 of FIG. 1. DSLAM 551 is respectively coupled to PPPOE user systems 511–513 over DSL connections 521–523. PPPOE user systems 511–513 and DSL connections 521–523 correspond to PPPOE user systems 111–113 and PPPOE links 121–123 of FIG. 1. DSLAM 551 is coupled to ATM mux 552 over DS-3 connection 554. ATM mux 552 is coupled to ATM edge switch 553 over OC-3 connection 555. ATM edge switch 553 is coupled to RADIUS server 501 over OC-3 connection 556. RADIUS server 501 is coupled to Internet 530 over OC-3 connection 557. User PPPOE system 511 includes personal computers 561–563 coupled to hub 564. Hub 564 is coupled to DSL connection 521. PPPOE user systems 512–513 are configured in a similar fashion.

In this example, DS-3 connection 554 limits the available system bandwidth to 39 Mb/s. Together, the PPPOE user systems (some are not shown) are using an average system bandwidth of 38 Mb/s. Thus, the maximum bandwidth authorization is 1 Mb/s (39 Mb/s–38 Mb/s=1 Mb/s). If PPOE user system 511 requests access at 1.5 Mb/s, and if the threshold is set at this requested bandwidth, then the maximum bandwidth authorization (1 Mb/s) does not exceed the threshold (1.5 MB/s), so model server 502 denies the access request. Model server 502 could be configured to notify PPPOE user system 511 when the bandwidth becomes available to grant the 1.5 Mb/s request. If PPPOE user system 511 requests access at 0.5 Mb/s, and if the threshold is set at this requested bandwidth, then the maximum bandwidth authorization (1 Mb/s) exceeds the threshold (0.5 MB/s), so model server 502 grants the access request.

What is claimed is:

1. A method of operating a server system to provide admission control for a communication system wherein Point-to-Point Protocol Over Ethernet (PPPOE) user systems transfer requests to use the communication system and transfer bandwidth usage information indicating their respective bandwidth usage, the method comprising:
   receiving and processing the bandwidth usage information to determine average system bandwidth usage;
   processing an available system bandwidth and the average system bandwidth usage to determine a maximum bandwidth authorization;
   receiving one of the requests, and in response, determining if the maximum bandwidth authorization exceeds a threshold;
   if the maximum bandwidth authorization exceeds the threshold, then granting the one request; and
   if the maximum bandwidth authorization does not exceed the threshold, then denying the one request.

2. The method of claim 1 wherein processing the available system bandwidth and the average system bandwidth usage to determine the maximum bandwidth authorization comprises subtracting the average system bandwidth usage from the available system bandwidth to determine the maximum bandwidth authorization.

3. The method of claim 1 further comprising determining the available system bandwidth based on a maximum system bandwidth and a user system control parameter.

4. The method of claim 3 wherein determining the available system bandwidth based on the maximum system bandwidth and the user system control parameter comprises subtracting the maximum system bandwidth times the user system control parameter from the maximum system bandwidth to determine the available system bandwidth.

5. The method of claim 1 further comprising processing the bandwidth usage information to determine current system bandwidth usage.

6. The method of claim 1 wherein the threshold is zero.

7. The method of claim 1 wherein granting the one request comprises indicating the maximum bandwidth authorization.

8. The method of claim 1 wherein the maximum system bandwidth is based on constraints of a communication link shared by the PPPOE user systems.

9. The method of claim 1 further comprising indicating the average system bandwidth usage for classes of the PPPOE user systems.

10. The method of claim 1 wherein the server system comprises a RADIUS server.

11. A server system to provide admission control for a communication system wherein Point-to-Point Protocol Over Ethernet (PPPOE) user systems transfer requests to use the communication system and transfer bandwidth usage information indicating their respective bandwidth usage, the server system comprising:
    a communication interface configured to receive the bandwidth usage information and to receive the requests; and
    a processing system configured to process the bandwidth usage information to determine average system bandwidth usage, process an available system bandwidth and the average system bandwidth usage to determine a maximum bandwidth authorization, determine if the maximum bandwidth authorization exceeds a threshold in response to one of the requests, and if the maximum bandwidth authorization exceeds the threshold, then to grant the one request, and if the maximum bandwidth authorization does not exceed the threshold, then to deny the one request.

12. The server system of claim 11 wherein the processing system is configured to subtract the average system bandwidth usage from the available system bandwidth to determine the maximum bandwidth authorization.

13. The server system of claim 11 wherein the processing system is configured to determine the available system bandwidth based on a maximum system bandwidth and a user system control parameter.

14. The server system of claim 13 wherein the processing system is configured to subtract the maximum system bandwidth times the user system control parameter from the maximum system bandwidth to determine the available system bandwidth.

15. The server system of claim 11 wherein the processing system is configured to process the bandwidth usage information to determine current system bandwidth usage.

16. The server system of claim 11 wherein the threshold is zero.

17. The server system of claim 11 wherein the processing system is configured to indicate the maximum bandwidth authorization when granting the one request.

18. The server system of claim 11 wherein the maximum system bandwidth is based on constraints of a communication link shared by the PPPOE user systems.

19. The server system of claim 11 wherein the processing system is configured to indicate the average system bandwidth usage for classes of the PPPOE user systems.

20. The server system of claim 11 wherein the server system comprises a RADIUS server.

21. A software product for a server system to provide admission control for a communication system wherein Point-to-Point Protocol Over Ethernet (PPPOE) user systems transfer requests to use the communication system and transfer bandwidth usage information indicating their respective bandwidth usage, the software product comprising:

application software configured to direct the server system to process the bandwidth usage information to determine average system bandwidth usage, process an available system bandwidth and the average system bandwidth usage to determine a maximum bandwidth authorization, determine if the maximum bandwidth authorization exceeds a threshold in response to one of the requests, and if the maximum bandwidth authorization exceeds the threshold, then to grant the one request, and if the maximum bandwidth authorization does not exceed the threshold, then to deny the one request; and a storage system that stores the application software.

22. The software product of claim 21 wherein the application software is configured to direct the server system to subtract the average system bandwidth usage from the available system bandwidth to determine the maximum bandwidth authorization.

23. The software product of claim 21 wherein the application software is configured to direct the server system to determine the available system bandwidth based on a maximum system bandwidth and a user system control parameter.

24. The software product of claim 23 wherein the application software is configured to direct the server system to subtract the maximum system bandwidth times the user system control parameter from the maximum system bandwidth to determine the available system bandwidth.

25. The software product of claim 21 wherein the application software is configured to direct the server system to process the bandwidth usage information to determine current system bandwidth usage.

26. The software product of claim 21 wherein the threshold is zero.

27. The software product of claim 21 wherein the application software is configured to direct the server system to indicate the maximum bandwidth authorization when granting the one request.

28. The software product of claim 21 wherein the maximum system bandwidth is based on constraints of a communication link shared by the PPPOE user systems.

29. The software product of claim 21 wherein the application software is configured to direct the server system to indicate the average system bandwidth usage for classes of the PPPOE user systems.

30. The software product of claim 21 wherein the server system comprises a RADIUS server.

* * * * *